Nov. 29, 1960    J. PICKLES    2,962,084
AUTOMATICALLY ADJUSTABLE SEAT SUPPORTS
Filed April 7, 1958    3 Sheets-Sheet 3

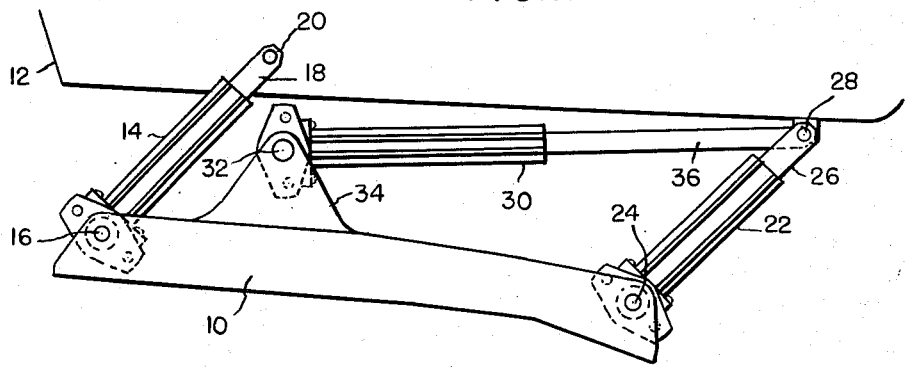
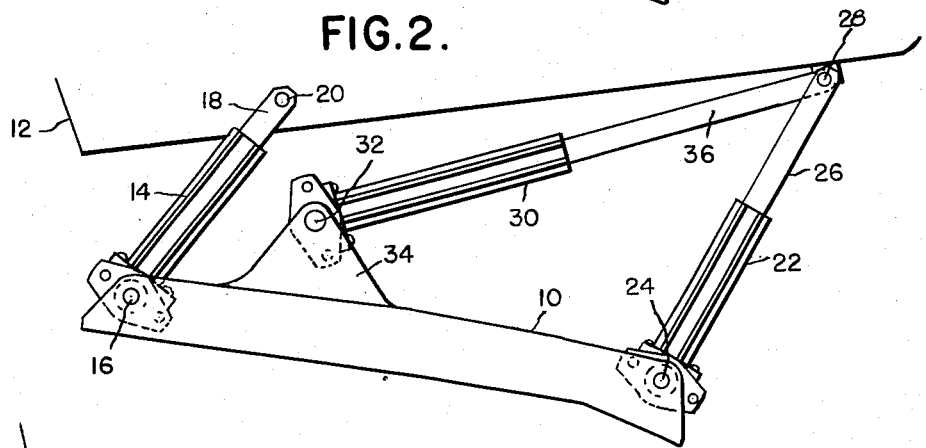
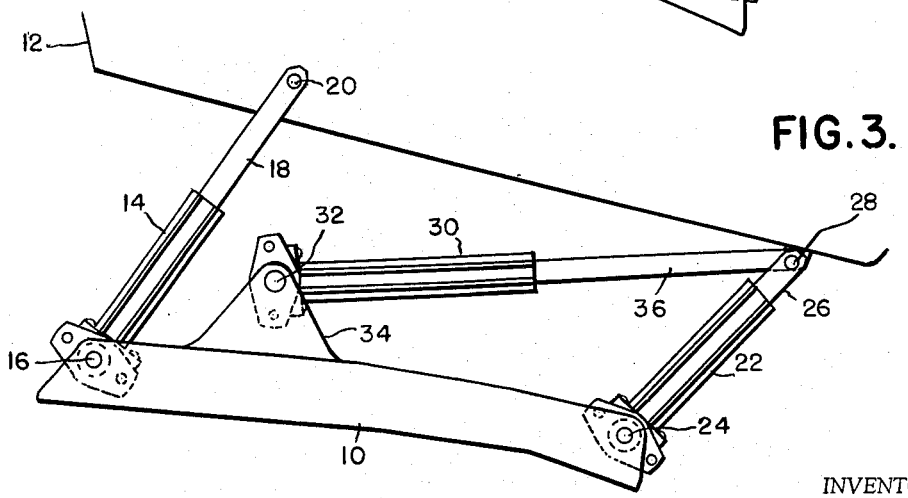

INVENTOR.
JOSEPH PICKLES
BY Whittemore,
Hulbert & Belknap
ATTORNEYS

United States Patent Office 2,962,084
Patented Nov. 29, 1960

2,962,084

AUTOMATICALLY ADJUSTABLE SEAT SUPPORTS

Joseph Pickles, Dearborn, Mich., assignor to Ferro Stamping Company, Detroit, Mich., a corporation of Michigan Filed Apr. 7, 1958, Ser. No. 726,738

3 Claims. (Cl. 155—14)

The present invention relates to automatically adjustable seat supports.

It is an object of the present invention to provide a seat support comprising a plurality of identical extensible linkages interconnected in pairs between a stationary support and a movable seat and capable of independent actuation to produce generally vertical and horizontal adjustment of the seat as well as selective tilting thereof.

More specifically, it is an object of the present invention to provide seat supporting structure comprising a plurality of extensible threaded members which are pivotally connected at their ends to a stationary support and to an adjustable seat, and drive means for selectively actuating said members.

Still more specifically, it is an object of the present invention to provide a pair of extensible members in pivoted relation between a stationary support and the front edge of a seat, a second pair of extensible members in pivoted relation between said stationary support and the rear edge of said seat, and a third pair of extensible members interconnected in pivoted relation and disposed generally horizontally between said support and said seat.

It is a further object of the present invention to provide extensible links for use as seat support members comprising a housing, a threaded shaft extending from said housing, drive means within said housing connected to said shaft, and a tubular member overlying said threaded shaft and having a nut at its inner end in threaded engagement with said shaft.

It is a further object of the present invention to provide seat supporting links each of which comprises a housing, a driven gear in said housing, a threaded member connected to said driven gear, a drive gear in said housing in mesh with said driven gear, an elongated member having threads thereon in threaded engagement with said first threaded member, a motor, and flexible drive means connecting said motor and said driving gear.

Other objects and features of the invention will become apparent as the description proceeds, especially when taken in conjunction with the accompanying drawings, illustrating preferred embodiments of the invention, wherein:

Figure 1 is a side elevational view of a seat supporting and adjusting construction in accordance with the present invention.

Figures 2–6 are views similar to Figure 1 showing the construction in different adjusted positions.

Figure 4:
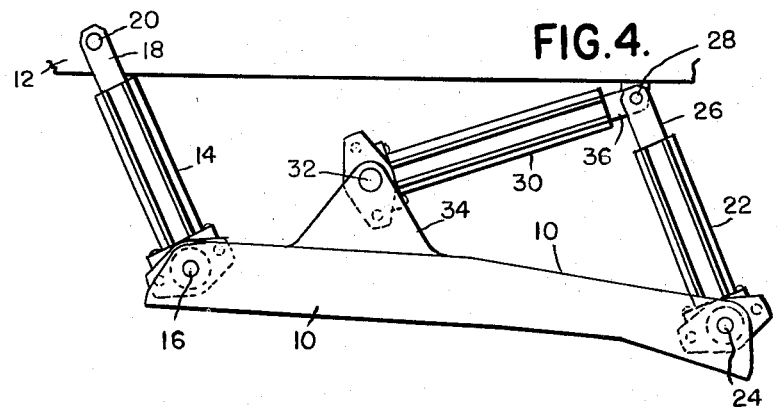

Referring first to Figure 1 there is shown at 10 a support which is adapted to be rigidly connected to the floor of an automotive vehicle. The lower portion of a seat frame is indicated at 12 and supporting and adjusting means are provided for interconnecting the stationary base or support 10 to the movable seat 12. This supporting and adjusting means comprises a pair of front extensible links, one of which is shown at 14. It will be understood that the linkage for supporting and adjusting the seat is arranged in pairs. The extensible link 14 is pivoted to the base 10 as indicated at 16 and includes a longitudinally movable portion 18 which is pivoted to the seat 12 adjacent the forward edge thereof as indicated at 20.

Similarly, a pair of rear supporting links are provided one of which is shown at 22 including a portion pivoted to the base 10 as indicated at 24 and an extensible portion 26 pivoted to the seat adjacent the rear thereof as indicated at 28.

Finally, a third pair of links are provided one of which is indicated at 30 and includes a portion which is pivoted as indicated at 32 to an upstanding ear 34 on the base 10. The link includes a longitudinally movable portion 36 which is pivoted to the seat 12 adjacent the rear thereof, the pivot connection conveniently being the same as that which is provided for the extensible portion 26 of the rear supporting link 22.

Before referring to the detailed construction of the extensible links it will be observed in the first place that in Figure 1 the seat is in a rear position and both its front and rear edges are in lowered position. As best seen in Figure 2 the seat may be adjusted to have a forward tilted position by extension of the rear link 22 without changing the extension of the front link 14 or the adjusting link 30. Similarly, as best seen in Figure 3, the seat 12 may be given a rearward tilted position from the position seen in Figure 1 by extending the front link 14 without changing the extension of the intermediate or adjusting link 30 and the rear link 22.

In Figure 4 there is shown the forward adjusted position of the seat 12 which is a position resulting from an adjustment of the intermediate adjusting link 30 from the position illustrated in Figure 1 without affecting the adjustment of the front links 14 or the rear links 22.

Figure 5:
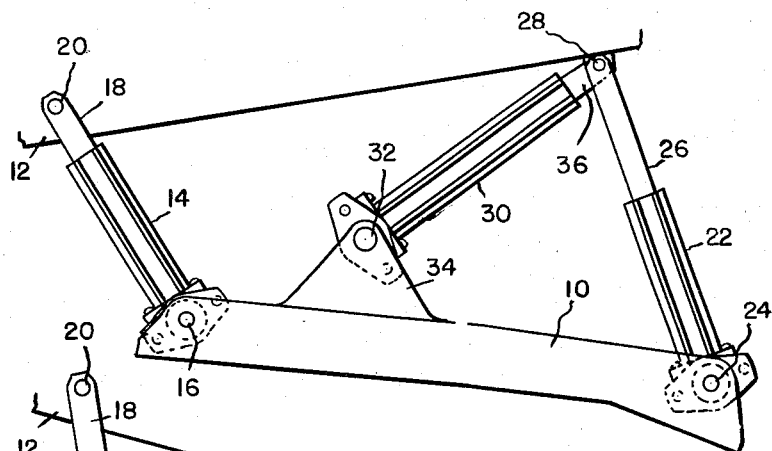

With the parts in the position illustrated in Figure 4, the seat 12 may be given a forward tilted position by extension of the rear link 22 without changing the extension of the front link 14 or the intermediate adjusting link 30, this position being seen in Figure 5.

Figure 6:
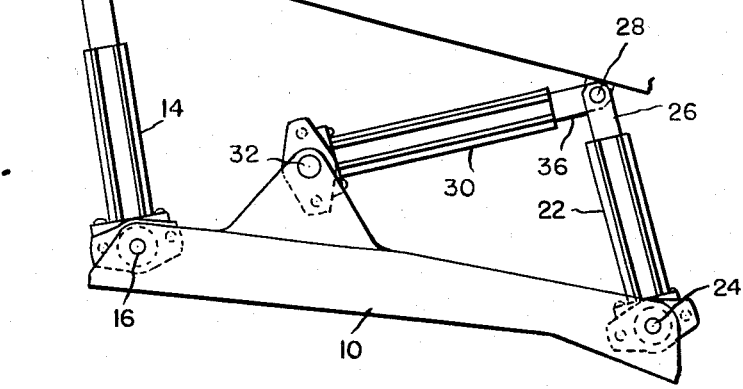

In Figure 6 the seat 12 is located in a forward position as a result of a collapse of the intermediate adjusting link 30, an extension of the front adjusting link 14, and collapse of the rear adjusting link 22.

It will be further understood of course that with the parts in the position illustrated in Figure 4 the front links 14 and the rear links 22 may both be extended which will result in the elevated forward position of the seat without substantial tilting thereof. It is also obvious of course that any intermediate position may be selectively determined.

The requirements for the operation described in connection with Figures 1–6 is that the front and rear supporting links be arranged such that they move through a vertical position upon full movement between front and rear positions of the seat as determined by extension of the intermediate adjusting link 30. Secondly, it is a requirement that the adjusting link 30 be disposed generally horizontally or at least so as to have a very substantial horizontal component so that extension and collapse thereof so far as possible produces fore and aft adjustment of the seat. It is appreciated of course that this fore and aft adjustment, since it results from rocking of the front link 14 and the rear link 22, causes the seat to move forwardly in an arc the high point of which is located somewhere near the middle of its fore and aft movement.

It is further pointed out that the intermediate adjusting link 30, the rear link 22, and the intermediate portion of the base 10 constitutes a triangle so that with these two links locked against extension or collapse, the pivot point 28 is fixedly located. At this time adjustment of the forward link 14 therefore produces rocking movement of the seat about the fixed pivot 28. Since the links, as will subsequently be described, become in effect rigid link members when not undergoing extension or collapse, it will be apparent that the linkage thus produced is highly stable and is adapted to support the seat firmly and rigidly in any position of adjustment.

It is further to be noted that due to the design of the linkage, the front and rear supporting links 14 and 22 are all subjected to compression in use, thus further increasing stability of the system as a whole.

Figure 7:
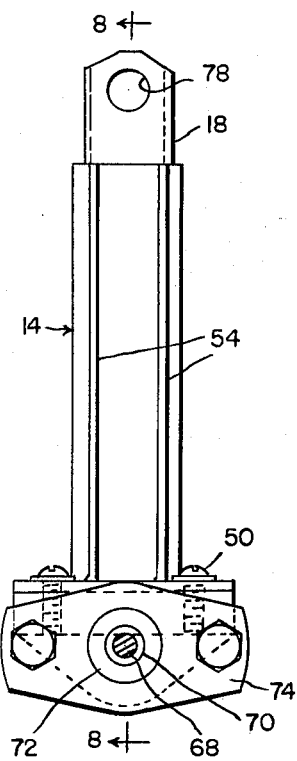
Figure 7 is a side elevation of the extensible linkage included in the seat supporting and adjusting mechanism.
Figure 8:
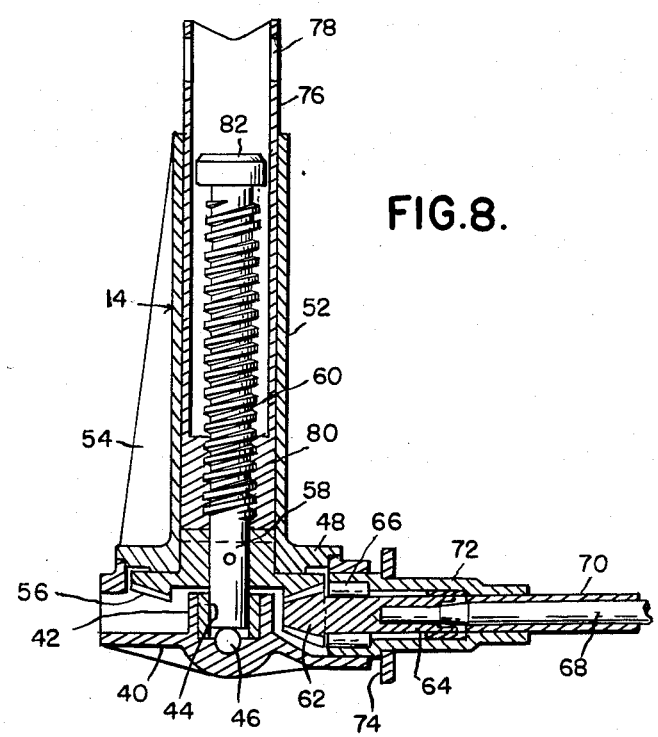
Figure 8 is a sectional view on the line 8—8, Figure 7.
Figure 9:
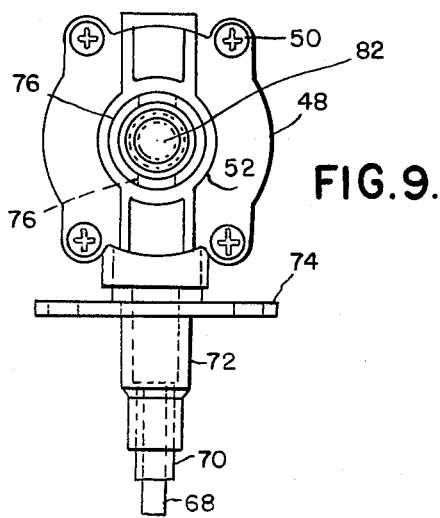
Figure 9 is an end view of the extensible linkage.

It is important to note that the six links which make up the adjustable seat support are or may be exactly or substantially identical, thus simplifying production, servicing, and repair as well as producing a very economical structure. The details of the structure of the links is shown in Figures 7–9 where for example a front link 14 is illustrated. The link 14 comprises a housing 40 including an internal tubular seat 42 which receives a sleeve bearing 44 and which also receives a ball thrust bearing 46. The housing 40 is provided with a removable cover 48 which is attached to the housing by means of screws indicated at 50. The cover 48 includes an elongated tubular extension arm 52 which preferably is reinforced as by flanges 54. Located within the housing is a driven gear 56 which as shown is in the form of a bevel gear keyed or otherwise secured as indicated at 58 to an elongated threaded shaft 60.

Extending into one end of the housing 40 is a driving bevel gear 62 which meshes with the bevel gear 56, the bevel gear 62 having a shaft portion 64 suitably supported in bearings 66 and connected to a flexible drive shaft 68 extending through an armored tubular flexible housing 70. One end of the flexible housing 70 extends into the tubular mounting member 72 where it may be clinched therein. The link as a whole is pivoted by means of the member 72, a pivot mounting bracket for the assembly being indicated at 74.

Movable longitudinally within the tubing extension 52 of the cover 48 is a tubular extension 18 having openings in its outer end as indicated at 78 to receive a pivot mounting as for example as indicated at 20 in Figure 1. At its inner end the tubular member 18 is provided with a nut portion 80 threaded to engage the threads of the shaft 60.

It will of course be apparent that in assembly the tubular extension 18 is connected to a portion of the seat by a suitable pivot mounting which also serves the additional function of preventing rotation of the tubular extension 18 about its own axis. Accordingly, when rotation is imparted to the gears 62 and 56, the resulting rotation of the threaded shaft 60 causes movement of the tubular extension 18 longitudinally thereof. Conveniently, the end of the threaded shaft 60 may be headed as indicated at 82 to constitute a stop when engaged by the nut portion 80 of the tubular extension.

In the past difficulty has been encountered in interconnecting corresponding links or adjusting support members at opposite ends of a vehicle seat due to the usual presence of an upstanding shaft tunnel on the vehicle floor. In the present invention this difficulty is avoided since the extension and collapse of all of the extensible links is through flexible cables 68, 70 and these of course may be caused to curve upwardly over the tunnel without interfering with the successful operation thereof. Conveniently, the mechanism may be driven from a single electric motor having suitable clutch means for controlling its output selectively to any of the three pairs of extensible links. This arrangement is clearly disclosed in my copending application Serial No. 540,917, filed October 17, 1955, now Patent No. 2,931,242, and a description of this power means is not believed necessary herein. It may be noted that for purposes of interpretation, the shaft 68 may be considered as means for driving the gear 62, it being understood that a similar shaft 68 will extend from the motor or to the other one of the pair of extensible links.

Obviously of course, if desired, separate drive motors may be provided for effecting each of the several adjustments.

While reference is made to a pair of control links 30, it may in some cases be satisfactory to use a single link for adjusting the seat fore and aft.

The drawings and the foregoing specification constitute a description of the improved automatically adjustable seat supports in such full, clear, concise and exact terms as to enable any person skilled in the art to practice the invention, the scope of which is indicated by the appended claims.

What I claim as my invention is:

1. An adjustable vehicle seat construction comprising a seat frame, adjustable support structure to support said frame from the floor of the vehicle for fore and aft adjustment, vertical adjustment, and selective tilting adjustment, said support structure comprising a pair of extensible front links pivotally connected at their lower ends to said floor for swinging movement about horizontal axes extending transversely of the vehicle from generally rearwardly extending to generally forwardly extending positions through an intermediate substantially vertical position and pivotally connected at their upper ends to the front portion of said seat frame, a pair of extensible rear links pivotally connected at their lower ends to said floor for swinging movement about horizontal axes extending transversely of the vehicle from generally rearwardly extending to generally forwardly extending positions through an intermediate substantially vertical position and pivotally connected at their upper ends to the rear portion of said seat frame, an extensible control link pivotally connected at one end to the floor and at the other end to said seat frame and extending generally fore and aft of the vehicle, and power means for selectively extending and contracting said links to effect fore and aft adjustment without substantial vertical displacement or tilting, vertical adjustment without substantial horizontal displacement or tilting, or tilting adjustment without substantial horizontal or vertical displacement.

2. A seat construction as defined in claim 1 in which the links comprise relatively rotatable threaded telescoping sections.

3. A seat construction as defined in claim 2 in which said power means includes a pair of flexible drive cables geared to the rotatable sections of said front links and a second pair of flexible drive cables geared to the rotatable sections of said rear links.

References Cited in the file of this patent

UNITED STATES PATENTS

| 635,304 | Culver | Oct. 24, 1899 |
| 987,831 | Scott | Mar. 28, 1911 |
| 2,555,804 | McCarthy | June 5, 1951 |
| 2,707,137 | Hollstein | Apr. 26, 1955 |
| 2,765,024 | Brundage | Oct. 2, 1956 |
| 2,809,689 | Garvey et al. | Oct. 15, 1957 |
| 2,839,124 | Desmond | June 17, 1958 |

FOREIGN PATENTS

| 886,947 | France | July 26, 1943 |